US011184676B2

United States Patent
Moehrle

(10) Patent No.: US 11,184,676 B2
(45) Date of Patent: Nov. 23, 2021

(54) AUTOMATED PROCESS FOR RANKING SEGMENTED VIDEO FILES

(71) Applicant: Armin E. Moehrle, Chicago, IL (US)

(72) Inventor: Armin E. Moehrle, Chicago, IL (US)

(*) Notice: Subject to any disclaimer, the term of this patent is extended or adjusted under 35 U.S.C. 154(b) by 0 days.

(21) Appl. No.: 16/953,166

(22) Filed: Nov. 19, 2020

(65) Prior Publication Data

US 2021/0104262 A1 Apr. 8, 2021

Related U.S. Application Data

(63) Continuation of application No. 15/803,820, filed on Nov. 5, 2017, now Pat. No. 10,491,956, which is a (Continued)

(51) Int. Cl.
*G06Q 30/00* (2012.01)
*H04N 21/4725* (2011.01)
*G06Q 30/02* (2012.01)
*G06Q 30/06* (2012.01)
*H04N 21/2547* (2011.01)
*H04N 21/478* (2011.01)
*H04N 21/81* (2011.01)
(Continued)

(52) U.S. Cl.
CPC ......... *H04N 21/4725* (2013.01); *G06F 16/71* (2019.01); *G06K 9/00718* (2013.01); *G06K 9/00765* (2013.01); *G06Q 30/02* (2013.01); *G06Q 30/0641* (2013.01); *G11B 27/19* (2013.01); *H04N 21/2547* (2013.01); *H04N 21/47815* (2013.01); *H04N 21/812* (2013.01)

(58) Field of Classification Search
CPC ................ G06F 16/71; G06K 9/00718; G06K 9/00765; G11B 27/19
See application file for complete search history.

(56) References Cited

U.S. PATENT DOCUMENTS

| 5,077,608 A | 12/1991 | Dubner |
| 2002/0056136 A1 | 5/2002 | Wistendahl |

(Continued)

FOREIGN PATENT DOCUMENTS

WO 0116842 3/2001

OTHER PUBLICATIONS

Indian inventor develops interactive streaming audio and video browser. (Dec. 26, 2009). Indian Patents News Retrieved from https://search.proquest.com/docview/443306543?accountid=14753.*

*Primary Examiner* — Kathleen Palavecino

(74) *Attorney, Agent, or Firm* — Jonathan D. Feuchtwang

(57) ABSTRACT

System for ranking segmented video files, comprising a server including a computer, said server including one or more segmented video files stored in a video database, each said segmented video file containing video information for visually reproducing at least one video object, where a video object is a visual component of the video file; an object inventory database operating on said server and containing information describing a location of said at least one video object within each of at least one image frame within at least one of the segmented video files; the server executing software indexing each segmented video file for the occurrence of at least one video object; the server executing software determining a duration of time that the at least one video object appears in each video file.

3 Claims, 12 Drawing Sheets

Related U.S. Application Data continuation of application No. 12/953,319, filed on Nov. 23, 2010, now Pat. No. 9,838,744.

(60) Provisional application No. 61/393,532, filed on Oct. 15, 2010, provisional application No. 61/266,162, filed on Dec. 3, 2009.

(51) Int. Cl.
*G06F 16/71* (2019.01)
*G06K 9/00* (2006.01)
*G11B 27/19* (2006.01)

(56) References Cited

U.S. PATENT DOCUMENTS

| | | |
|---|---|---|
| 2004/0068758 A1 | 4/2004 | Daily |
| 2007/0238959 A1 | 10/2007 | John |
| 2009/0141941 A1 | 6/2009 | Wagg |
| 2011/0016487 A1 | 1/2011 | Chalozin |
| 2011/0063415 A1 | 3/2011 | Gefen |
| 2011/0263332 A1 | 10/2011 | Mizrachi |

\* cited by examiner (slow down video play back on pointer entering frame)

| unique object ID | semantic description of object | unique object occurence ID and reference data | film data | context and verbatim of occurance | metadata viewer profile | bid per viewer profile channel 1 | bid per viewer profile channel n | winning bid, owner data, run time |
|---|---|---|---|---|---|---|---|---|
| 1.1.1.11.1 | silver necklace | 1.1.1.1.1.A, x,y,z,t | HBO, comedy-drama, sex and the city, cable television series, picture format 480i SDTC etc | Charlotte York (Kristin Davis) having lunch with Miranda Hobbes (Cynthia Nixon) at Sushi Samba discussing birthday present, "....bla, bla, bla..." | target: female, 30y, income 80k, etc, transaction history, viewer profile etc | MMXV: $1 MMXZ: $3 | MMXV: $1.5 MMXZ: $2 | Tiffany, December 1, 2008-december 31, 2008 |
| 1.1.1.11.1 | silver necklace | 1.1.1.1.1.B, x,y,z,t | | | | | | |
| 1.1.1.11.1 | silver necklace | 1.1.1.1.1.C, x,y,z,t | | | | | | |
| 1.1.1.11.1 | silver necklace | 1.1.1.1.1.D, x,y,z,t | | | | | | |
| 1.1.1.11.1 | silver necklace | 1.1.1.1.1.E, x,y,z,t | | | | | | |
| 1.1.1.11.2 | | | | | | | | |

FIG. 7

AUTOMATED PROCESS FOR RANKING SEGMENTED VIDEO FILES

FIELD OF THE INVENTION

The present invention relates to a system for automatically segmenting and classifying video content objects within a video, auctioning rights to associate relevant content with the video objects, and creating an overlay with select video objects which enables a video viewer to interact with video object in the video and interact with the relevant content.

BACKGROUND

Video is the technology of electronically capturing, recording, processing, storing, transmitting, and reconstructing a sequence of still images representing scenes in motion. Video technology was first developed for television systems, but has been further developed in many formats to allow for viewer video recording. Motion pictures on film can be converted into video formats. Video can also be viewed through the Internet (World Wide Web) as downloaded video files or streaming files on computer monitors.

Animation is the rapid display of a sequence of images of artwork or model positions in order to create an illusion of movement. It is an optical illusion of motion due to the phenomenon of persistence of vision, and can be created and demonstrated in a number of ways. The most common method of presenting animation is as a motion picture or video, although several other forms of presenting animation also exist.

Video content segmentation is the systematic decomposition of a motion picture frame into its objects (components) such as a person, a shirt, a tree, a leave etc. Segmenting video content results in a large number of objects with little value if not classified.

Classification is the process of assigning an object of one frame to the same class of the same object of another frame. It enables the automated recognition that a specific red shirt in one frame is the same as the red shirt in another frame. There are several approaches to assigning video objects to the class they belong to such as by the contours of its appearances in successive video frames. For example, this may be done by matching curvature features of the video object contour to a database containing preprocessed views of prototypical objects. See, Attachment 1 entitled MOCA Project Object Recognition.

For each two-dimensional appearance of an object in a video frame curvature features of its contour are calculated. These features are matched to those of views of prototypical video objects stored in a database. By applying context rules such as "a house may have a car in the frame or may have a tree in the frame but does not have a TV in the frame" the accuracy can be increased. The final classification of the object is achieved by integrating the matching results for successive frames.

There are several paradigms and algorithms for video segmentation and classification. Most are based on segmenting video into layers such as a static background layer and a dynamic foreground layer and using multiple cues, such as spatial location, color, motion, contours and depth discontinuities, etc.

Rotoscoping is an animation technique in which animators trace over live action film movement, frame by frame, for use in animated films. Digital Rotoscoping as taught by Tostevin et. al. in U.S. Pat. No. 6,393,134 uses algorithms to create vector outlines of video objects.

By shooting video from several perspectives with synchronized cameras, video segmentation algorithms can be used to automatically reconstruct 3D wireframes of moving objects. If video segments show multiple perspective of one video object, 3D wire frames can be constructed even if only one camera was used as long as the camera captured many perspectives of the object.

In one embodiment of the invention automatic rotoscoping techniques are applied to videos which have been shot by multiple camera angles to reconstruct the 3D objects and save their wireframes in form of vector data into the video object database. In another embodiment rotoscoping techniques are applied to videos which have been shot by one camera but many perspectives of the video objects are available. When a viewer selects an object for which there is 3D information available, the viewer is presented with a means to control the animation of the 3D object such as rotate, move, scale etc. In yet another embodiment of the invention animated 3D objects are positioned into videos to replace or superimpose video objects. These animated 3D video objects may have been derived from digital rotoscoping or may be animated objects from scratch.

An object of the invention is to provide an automated system for segmenting raw video to create an inventory of video objects which may be used to make the video interactive, and to auction these video objects to advertisers. The term video object is defined as data and visualizations of data which relate to content objects of videos such as a shirt. This data may include image data, or vector graphic data which has been linked to the content object of a video or has been generated from video data.

The invention is not tied to any specific method of segmenting or classifying video content objects.

In one embodiment of the invention an object information library which contains descriptive information and/or metadata regarding objects which may appear in the video is used to associate meta data such as product information, unique product identification information or stock keeping units with the segmented video objects.

A further object of the invention is to create an advertising market exchange whereby rights to an inventory of video objects are automatically auctioned to a third party such as an advertiser.

SUMMARY OF THE INVENTION

Disclosed is a system for viewing video having segmented video objects. The system includes a video server including a computer connectable to a distributed network and having a processor, random access memory, read-only memory, and mass storage memory. At least one video file is stored in a video database on or accessible to the video server. An object inventory database is stored on or accessible to the video server, the object inventory database containing information describing a location of at least one video object within the at least one video file. Object description content is stored in a database stored on or accessible to the video server. A video overlay links the object description content with a given video object and creating a selectable hyperlink whose position tracks a dynamic location of the video object in the video, wherein the video overlay is adapted to allow a consumer to interact with the video overlay to select an object displayed in the video file and add the selected object to a collection of objects.

In some embodiments, the video server of the aforementioned system may include a software application for displaying content associated with the object.

In some embodiments, the video server of the aforementioned system may include a software application for storing one of the object or a data associated with the object in a collection of objects. The video server may include software for sharing the collection of objects or sharing a data associated with the collection of objects. The video server may share the collection of objects or data associated with the collection of objects with a social networking service (or social networking server) via the distributed network. The video server may post the collection of objects or data associated with the collection of objects to a social networking server accessible service via the distributed network. The social networking server may issue an alert to at least one user-specified person that data is posted to the server.

According to one aspect of the aforementioned system, the video server includes a software application for searching at least one of the object inventory database and the at least one video file for occurrences of the selected object, and selectively displaying segments of the at least one video file containing the selected object.

According to one aspect of the aforementioned system, the video server includes a software application for searching at least one of the object inventory database and video files in the video database for occurrences of the selected object, and selectively displaying segments of the at least one video file containing the selected object.

According to one aspect of the aforementioned system, the video server includes a software application for purchasing an item associated with the selected object.

According to one aspect of the aforementioned system, the video server includes video consumer software application includes a content display application interacts with the video overlay and displays relevant content when a given video object is selected hovered-over or pointed at with a pointing device.

According to one aspect of the aforementioned system, the video server includes a software application for storing one of the object or a hyperlink associated with the object in at least one user-defined collection of objects.

Also disclosed is a method for trading rights to video objects with an advertising market exchange, comprising providing at least one video file stored in a video database on or accessible to a video server via a distributed network; providing an object inventory database stored on or accessible to the video server via the distributed network, the object inventory database containing information describing a location of at least one video object within the at least one video file; providing a video overlay linking with a given video object and creating a selectable hyperlink whose position tracks a dynamic location of said video object in the video; accessing and displaying said at least one video file; and interacting with the video overlay to select an object displayed in the video file.

The aforementioned method may comprise a step of displaying content associated with the selected object.

The aforementioned method may comprise a step of storing one of the selected object or a hyperlink associated with the selected object in a collection of objects. Moreover, the method may include a step of sharing the collection of objects or sharing a hyperlink associated with the collection of objects via the distributed network. The video server may post the collection of objects or data associated with the collection of objects to a social networking server accessible service via the distributed network.

The aforementioned method may comprise a step of a step of searching at least one of the object information library and the at least one video file for occurrences of the selected object, and selectively displaying segments of the at least one video file containing the selected object.

The aforementioned method may comprise a step of a step of searching at least one of the object information library and video files in the video database for occurrences of the selected object, and selectively displaying segments of the at least one video file containing the selected object.

The aforementioned method may comprise a step of purchasing an item associated with the selected object. The purchasing step may be performed by a software application executed on the video server.

Also disclosed is a method for ranking the duration of object appearances in video files according to a duration of time, frequency and context a given object appears in the video. The method comprises providing a database of video files; searching each video file for the appearances of at least one object; determining a duration of time, frequency and context that the at least one object was displayed in each said video file; and for each said video file outputting information specifying the title of the video file and duration of time, frequency and context.

The method further includes outputting information specifying a ranking of said duration of time, frequency and context in a given said video file relative to each of the other video files in the database.

The method may further include searching each said video file for the appearance of first and second objects; determining a duration of time that each of the first object and the second object were displayed in each said video file; and for each said video file outputting information specifying the title of the video file and each duration of time.

The method includes automatic rotoscoping to reconstruct the 3D objects and save their wireframes in form of vector data into the video object database and allowing users to interact with the 3D objects.

The method includes method of positioning animated 3D objects into videos to replace or superimposed existing video objects.

The method includes documenting user interaction with video objects, searches for video objects and sharing of objects and collections with a social network and providing analytics of such documentation to advertisers. Disclosed is a system for creating an interactive overlay for a video, including a server including a computer having a processor, random access memory, read-only memory, and mass storage memory. The server includes one or more video files stored in a video database; an object inventory database stored on the server and containing information describing a location of at least one video object within one of the video files; and an overlay generation application (software or firmware) executed on the server. The overlay generation application creating a video overlay including at least one selectable hyperlink whose shape and position (coordinates) track a dynamic location of the video object in the video, and storing the overlay on the server.

The system of claim may further include a wireframe database stored on the server, the wire frame database storing a three-dimensional wireframe representation of at least one video object. The aforementioned overlay generation application matches occurrences of video objects in the object inventory library with three-dimensional wireframe representations of at least one video object and creates a video overlay including matched wire frame representations of the at least one video object wherein the shape and position of the wire frame representation tracks a dynamic location of the video object in the video.

Also disclosed is a system for making an interactive overlay for a video, including: a server including a computer having a processor, random access memory, read-only memory, and mass storage memory, the server including one or more video files stored in a video database. The system further includes an object inventory database stored on the server and containing information describing a location of at least one video object within one of the video files; a wire frame database stored on the server, the wireframe database storing a three-dimensional wireframe representations of at least one video object; and an overlay generation application (software or firmware) executed on the server, the overlay generation application matching occurrences of video objects in the object inventory library with three-dimensional wireframe representations of at least one video object and creating a video overlay including matched wire frame representations of the at least one video object wherein the shape and position of the wireframe representation tracks a dynamic location of the video object in the video, and storing the overlay on the server. The video overlay may optionally include at least one selectable hyperlink whose shape and position tracks a dynamic location of the video object in the video.

Also disclosed is a system for making an interactive overlay for a video, including a server including a computer having a processor, random access memory, read-only memory, and mass storage memory, the server including one or more video files stored in a video database. The system further includes an object inventory database stored on the server and containing information describing coordinates of at least one video object within one of the video files; a wireframe database stored on the server, the wireframe database storing three-dimensional wireframe representations of at least one video object; and a wireframe generation application executed on the server, the wireframe generation application selecting a video object from the video object inventory database and generating a three-dimensional wireframe of the selected video object from multiple perspective occurrences of the video object in the video file and storing the three-dimensional wireframe in the wire frame database. The wireframe generation application may optionally generate a lighting model for each occurrence of a video object in a video frame from light distribution on the video object.

The aforementioned system may further include an overlay generation application executed on the server, the overlay generation application matching occurrences of video objects in the object inventory library with three-dimensional wireframe representations of at least one video object and creating a video overlay including matched wire frame representations of the at least one video object wherein the shape and position of the wire frame representation tracks a dynamic location of the video object in the video, and storing the overlay on the server. The video overlay may optionally include at least one selectable hyperlink whose shape and position tracks a dynamic location of the video object in the video.

Also disclosed is a system for automatically segmenting and classifying video content into objects including: a server including a computer connectable to a distributed network and having a processor, random access memory, read-only memory, and mass storage memory, the video segmenting and classification server including one or more video files stored in a video database. The system further includes a wire frame database stored on the server, the wire frame database storing a three-dimensional wireframe representations of at least one video object and at least one of descriptive information and semantic information used to describe the object; an object inventory database containing information describing a location of at least one video object within one of the video files; and a video content analysis application executed on the processor, the video content analysis application segmenting the video files to identify locations of video objects, for each video object searching for a matching occurrence in the wireframe database, retrieving information describing the video object from the wireframe database, and storing in the object inventory database information describing the dynamic location of the video object within the video and information describing the video object.

BRIEF DESCRIPTION OF THE DRAWINGS

FIG. 7 is an exemplary object inventory database;

DETAILED DESCRIPTION OF THE INVENTION

The present invention is a system 100 for automatically segmenting video into video objects, classifying the video objects, assembling a database of the classified video objects, defining region definition data representing each video object on an interactive layer, auctioning the right to associate advertising with the regions representing video objects on a market exchange (hereinafter "VOME") 300, and creating a video overlay with region definition data linking relevant content with the video content objects and thereby creating an interactive video. The region is a portion of the video frame which is congruent with the underlying video object. The region definition data defines such portion of the video frame. The system 100 of the present invention consists of several distinct yet related components.

One aspect of the invention relates to the creation of an inventory of video objects and corresponding region definition data. The video object inventory 114 is a database containing region definition data in form of pointers or references to video objects within video or animation files. Importantly, the region definition data is used to make the video interactive by providing the ability to link supplemental information with a specific video object within a video. For example, the video viewer can select a car displayed within the video and learn the make and model of the car and other relevant information. The invention associates the relevant information with the video object thereby making the object a selectable hyperlink.

Figure 8A:
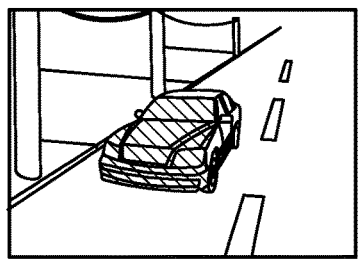
FIGS. 8A-8E are perspective views of a video object and a wire frame model created therefrom.
Figure 8B:
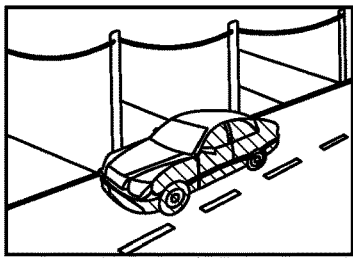
Figure 8C:
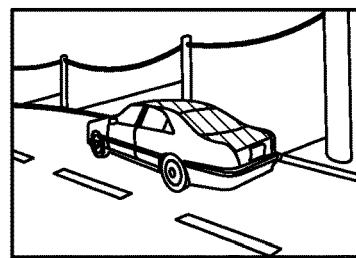
Figure 8D:
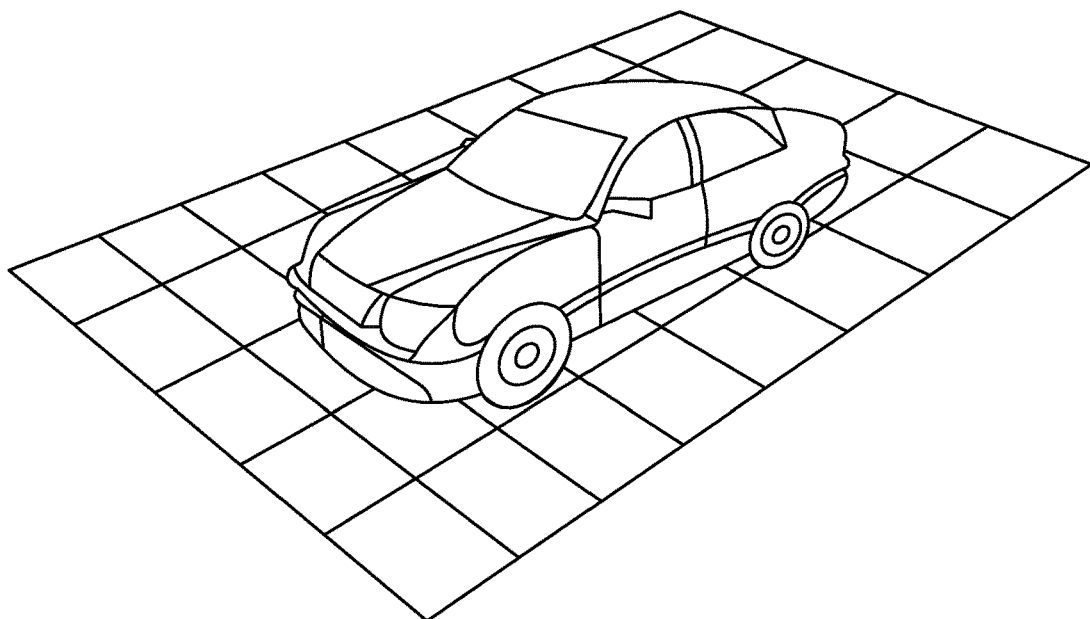

In one embodiment of the invention, recognized video objects are represented by 3D vector graphics data such as wire frame models FIG. 8D. The representation is created by computing the difference between perspective views FIG. 8A-8C on the object and then specifying each edge of the physical object where two mathematically continuous smooth surfaces meet, or by connecting an object's constituent vertices using straight lines or curves.

If not all views are available, then only a partial 3D model is created but completed once the missing views become available in additional videos.

Figure 8E:
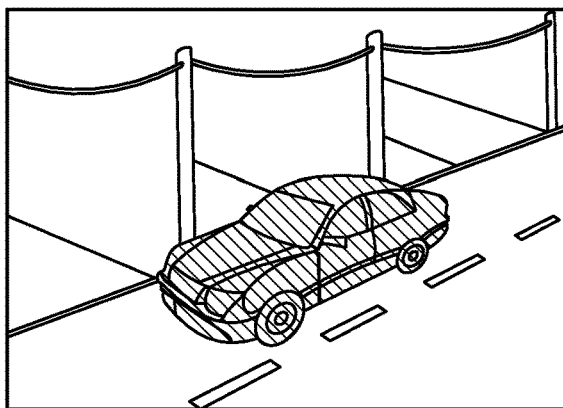

These 3D wireframe models may be used to improve the recognition of video objects but also may be used to represent the video objects as outlines of perspective views of the three-dimensional wireframe FIG. 8E. Such an embodiment allows users to rotate the view of the video object once selected. Furthermore, this embodiment allows additional animated 3D objects to be placed in videos complementing or superimposing original video objects.

According one embodiment, video objects are associated with meta-data and/or an object description which enables users (e.g., advertisers) to search for all instances of "automobile" and the search results will include "car" as well. The object description may be part of a semantic network which allows auction bidders to specify the object and the video context on which they want to bid. This may be useful for preventing exposure of an advertiser's brand in contexts which are not appropriate for the brand. The term video object as used in this specification refers to a video frame component, e.g., a car, a runner or a dog which appears in the video or animation. In one embodiment of the invention, motion attributes such as fast, slow, up, down etc. of video objects in the database will be indexed, which will allow auction bidders to specify their bids with motion attributes. In another embodiment, the states of objects will be indexed such as by means of facial expression algorithms already known in the art which extract the state of a person in a video such as happy or sad. According one embodiment a user may search for objects in videos by submitting a video object of an image of an object as the search input.

Hereinafter reference to video should be understood to encompass 2D video, 3D video and animation unless an explicit distinction is made. The video object database includes detailed information for identifying the location, shape and movement of the video object within the video file. The video object inventory may include detailed descriptions of the specific object in the video content such as manufacturer, make and model. As will be explained in further detail below, this detailed information may be used to link information such as relevant content with the video objects.

As will be explained below, according to various embodiments of the invention the video objects may be manually, semi-automatically or automatically identified and associated with relevant information.

A further aspect of the invention relates to the creation of a video object market exchange (VOME) in which bidders (advertisers) bid for the right to associate their relevant content with a given video object. It should be noted that the invention also enables a video content owner to only auction a certain portion of the video object inventory and sell the rest directly to an inventory buyer without the public bidding process.

Activation of Video Content

A further aspect of the invention relates to the creation of a video overlay which transforms "passive" video, e.g., video which you "passively" watch but with which you do not interact into interactive video where the viewer interacts with regions of the video by selecting, rolling over or pointing at a region within the video (with a pointing device such as a mouse or with a finger) thereby triggering the display of relevant content associated with the object.

The use of hyperlinks within static media such as a website is well known. In video games and animations, it is very common to click on objects. That is what makes it "interactive". Rich or interactive media refers to communication media that facilitates active participation by the recipient, hence interactivity. Traditional information theory would describe interactive media as those media that establish two-way communication. The present invention takes advantage of the two-way communication capabilities for documenting and analyzing user interaction with video objects including sharing of video objects or collections of objects with their social network via social network services. The present invention includes the creation of user profiles, which entail the history of interaction and sharing of video objects, and targeting relevant content to users of specific profiles. These profiles furthermore act as criteria for advertisers when they place their bids.

Identification and Compilation of Video Content

The present invention segments video and animation content into its objects and stores, region definition data such as shape, x, y, and temporal coordinates, or in the case of volumetric video or volumetric animation, the invention stores shape, x, y, z, and temporal coordinates. The term "temporal coordinate" refers to time, video frame or the like. Further, the term "video frame" is intended to convey an instantaneous (still) image frame of the video or animation at a particular time (location within the video stream). All of these coordinates are necessary to specify the video objects within a frame at a given moment in time.

An object of the present invention is to take conventional video content analysis technology such as currently used to identify a person within a crowd, or identify/inspect a widget on a conveyor belt and apply it to the field of marketing communication, advertising and commerce transaction. More particularly, it is an object of the invention to identify video objects of interest within video and animations. The identified video objects or content objects may be used to populate a video content inventory 114 used in an advertising market exchange. Moreover, video may be activated or made interactive using region definition data linking video objects with relevant content.

The method of the present invention should be understood to include both motion picture and object-based animation. Hereinafter reference to video should therefore be understood to include both motion picture and object-based animation.

Figure 1:
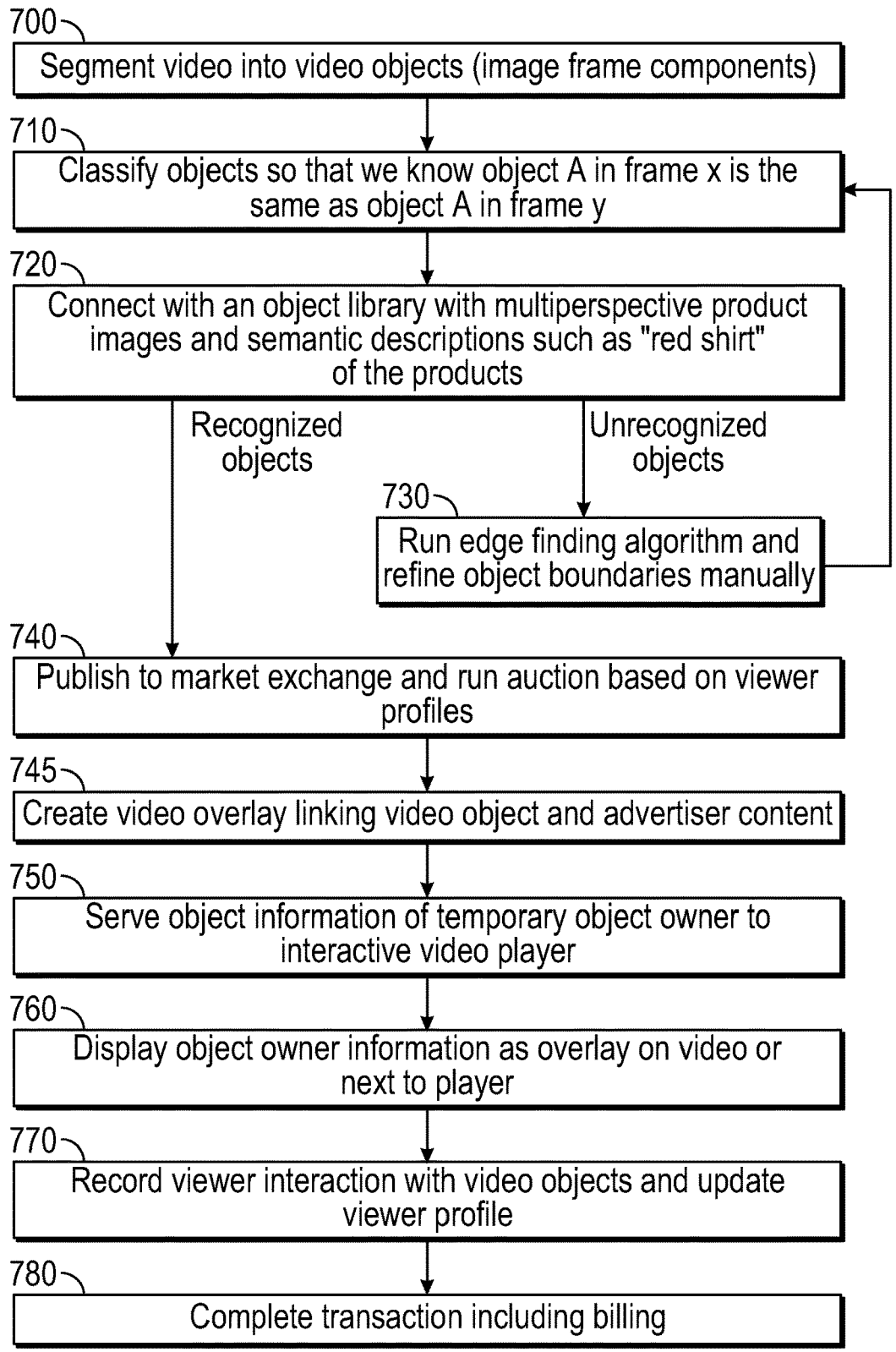
FIG. 1 is a flowchart of a video object market exchange process according to the present invention.

FIG. 1 is a high-level flow diagram of the method of a first embodiment of the present invention.

In steps 700 and 710 a video is segmented and classified using an automated segmentation and classification application to create a list or table of objects. The segmentation process 700 yields a list of video objects throughout the video (including the temporal coordinates and region definition date for each object) and the classification process 710 matches occurrences of the same object in different frames of the video thereby eliminating duplication/redundancy. It should be noted that the location, size and shape of a video object can and usually will vary throughout a video. The size of an object varies depending on its proximity which will vary as the object moves throughout the video. Similarly, the shape of an object may vary depending on the perspective or vantage point from which it is seen, e.g. frontal view versus side view. Moreover, the system of the invention is able to segment, track and classify a moving object. Thus, the location of the video object dynamically changes as the underlying object moves, which is represented in the region definition data.

In step 720, the video objects are compared with objects in an object library, which may be 2D (two-dimensional) or 3D (three-dimensional) wire frame data representing objects within the video. Perspective views from such 2D/3D wire frame models may be advantageous to the automatic object recognition process. This step is optional. If a match is detected then the object is associated with the product description and/or meta-data from the object library. The unmatched video object may be discarded or subjected to a secondary processing application and/or an analyst may manually identify/configure the object boundaries (step 730), and then the object may be subject to another classification step (710) and/or another comparison with objects in the object library (720).

In step 740, the video objects are published to the market exchange and subject to an automated auction process.

In step 745 a video overlay is created which links the video object with the advertiser provided content, and in step 750 the video overlay with region definition data is transmitted to the video broadcaster 120.

In step 760, a video viewer interacts with the video overlay by rolling-over or selecting a video region thereby triggering the display of relevant content associated with the video object. It should be appreciated that rolling over may illicit the display of different relevant content than that displayed when the object is selected. For example, selecting an object may trigger more detailed information than that displayed when the object is simply rolled-over with the pointing device.

In step 770 (optional), the VOME 300 records the viewer interaction with the video objects and updates the viewer's behavioral profile. It should be noted that the video viewer's interactions with the video overlay (and the video objects) generally triggers the display of relevant content from the VOME 300. This enables the content associated with a video object to be updated on-the-fly without the need to alter the video overlay. The video overlay makes the video interactive by making video regions selectable hyperlinks, but the actual content comes directly from the VOME 300.

In step 780 (optional), the VOME 100 completes a sales transaction initiated by the viewer's interactions with the video region representing the video object. As will be explained below in further detail, the VOME 300 may enable the viewer to complete a sales transaction.

Each of these steps will be described in additional detail below.

It should be appreciated that the relative order of steps can frequently be changed without impacting the system, for example steps 770 and 780 may be reversed without impacting the results. The listing of steps in a particular order should not be read as a limitation to a specific order unless it is clear from the context that a particular order is required.

Thus far, the method of the invention has been described with reference to video objects. However, the invention also pertains to the identification of events within a video, where an event is defined as an object moving through space. For example, a person is walking or a car is driving. Even if the object is not defined, the event can still have characteristics such as high velocity which might be of value to advertisers.

In object-based animation, each object is defined by its vector graphic class. Consequently, the analyst doesn't teach the system to recognize objects, but rather describes the objects of interest. For each described object, the system stores Object Information useful for identifying each occurrence of the object in the animation data.

Object based animations such as Adobe Flash or Java maintain object and event information. Other animation techniques lose references to objects and events during rendering. Once the references are lost, we have to apply object and event recognition techniques just like in regular pixel-based video.

In motion picture media, video content analysis technologies are used to identify objects based on size, shape, color, color density etc. The present invention is not limited to any particular method for identifying content objects within video and several different methods are discussed in detail below. Analysts may manually train the segmentation application 106 to recognize an object by, for example, tracing the outline of a video or the system may present patterns of content objects it found by statistical pattern recognition.

A video content analysis or video analytics application 106 which is explained below in further detail automatically detects additional occurrences of the identified object in the video. If desired, the video content analysis application 106 may search the internet for occurrences of identified object. The video content analysis application 106 may be provided with an object information library 112 containing 2D/3D wire frame models or characteristics for identifying one or more pre-defined objects from one or more differing perspectives, or the video content analysis application 106 may be provided with heuristics for identifying objects. For each identified occurrence of an object, the VOME 300 stores information for identifying the frame (temporal coordinate) and region definition data (location within the frame, e.g. x, y, and z coordinates) in which the object appears. Using the region definition data, the VOME 300 is able to dynamically track an object. It should be noted that the size, shape and location of the selectable region (hyperlink) corresponds to the size, shape, and location of the underlying object.

According to one refinement of the invention, the auction is automatically triggered when a viewer accesses or requests access to video content.

According to another refinement of the invention, the auction may be triggered by expiration of an advertiser's right to associate advertising with a given video object. The auction may further be triggered each time video objects are added to the inventory of video objects or on a periodic basis, e.g., every hour, day, or week.

In one embodiment advertiser can upload a database of images, video objects or 2D/3D wire frames to find matches in movies across multiple databases. The advertiser then can select objects, target groups and viewing context to bid on.

In another embodiment VOME 300 can present to the advertiser what objects are available in the video object database. The advertiser then can select objects, target group and viewing context to bid on.

According to yet another embodiment, the advertiser may search the database 114 of video objects (object inventory database) and purchase the rights to associate content with an object thereby bypassing the auction process, or may signal interest in participating in an auction by submitting an opening bid. Moreover, the advertiser may advise the VOME 300 of particular market segments, demographics, user behavioral profiles or the like which it is interested in bidding on.

The advertiser 122 may be provided with viewer profile information pertaining to the video viewer 124 who triggered the auction such as taught in U.S. Pat. No. 6,718,551 entitled Method and system for providing targeted advertisements" which is hereby incorporated by reference. It should be noted that the viewer profile information is available because the video viewer 124 triggers the auction by requesting access to the video.

The viewer profile may be a multifaceted viewer profile identifying, among other things, the viewer's click history, purchasing habits, social network, history of geographic locations, browsing and search habits, and/or additional demographic data. The multifaceted viewer profile may be compiled, inter alia, from cookies stored on the viewer's computer, or from third party information of the viewer. The multifaceted viewer profile information may be used in determining the relative value of a given viewer for a given bidder (advertiser).

In addition to providing the bidders with viewer profile information, the VOME 300 provides a list of the objects contained in a video or set of videos.

According to one embodiment, the VOME 300 solicits bids on an individual basis for rights to associate relevant content with one or more of the video objects contained in the video accessed by the viewer. Thus, different advertisers may own temporary rights to different video objects in a given video.

It should be noted that the advertising rights being auctioned are different from the traditional banner ads which are "pushed" to the video viewer. Push-advertising is advertising which is displayed on the top (banner) or the side of the viewer's display screen. Push-advertising is pushed to the viewer, i.e., the viewer does not specifically request the advertising. As will be explained below in further detail, according to one embodiment the video viewer pulls the relevant content by interacting with specific regions representing video objects within a video. For example, the viewer may point to a video frame, which causes the video to slow down, select or roll-over a video object within the video thereby triggering the VOME 300 to display contextual information linked or associated with the object as a pop up, overlay or in a field next to the video player. However, the VOME 300 may combine the pull advertising with conventional push-advertising. For example, the VOME 300 may push relevant content which relates to the objects as they appear in the video, or the VOME 300 may push advertising relating to the type of objects with which the viewer has interacted e.g., object which the viewer has rolled-over or selected.

As noted above, the VOME 300 may provide 3rd parties such as advertisers 122 with the profile of an actual video viewer in real-time before making the bid. Alternatively, the VOME 100 may simply auction rights to the video content objects for each of a plurality of market segments. For example, the VOME 100 may segment the market by a combination of age, gender, income, region or spending habits etc. or by similarity of behavioral profile. If the auction occurs prior to access by the video viewer 124 it will not be possible to provide the advertisers (bidder) with actual viewer profile information and the VOME 100 will auction the rights by market segment.

It should be understood that the term automatic as used herein refers to actions which take place without human intervention. In other words, the auction is initiated by the VOME 300 simply by the addition of new content to the inventory 114 or the expiration of previously auctioned rights etc. The VOME 300 automatically segments video files and automatically classifies the video objects. The advertiser's server may include an automated bidding application (software) which automatically submits bids to the VOME 300. Also, as will be explained below, the processing of video to create activated video objects, and the addition of such video objects to the inventory may itself occur without human intervention. Thus, the VOME 300 may according to some embodiments be a fully automated system. The only requirement for the system to run fully automatically is a preprocessed database 112 with images of objects from different viewing angles or 3D wire frame models of the objects with object descriptions.

Figure 2:
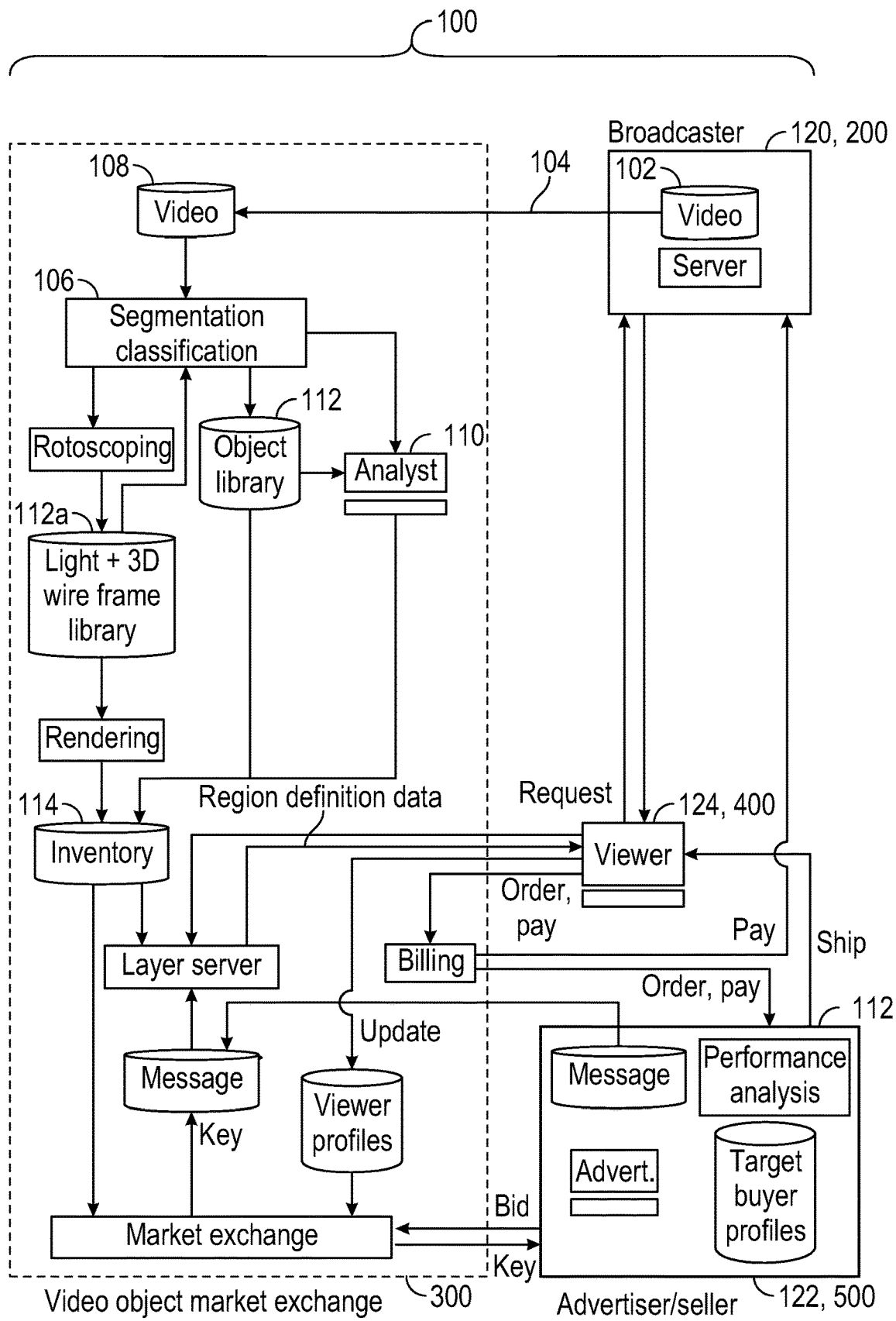
FIG. 2 is a block diagram of a video object market exchange system according to the present invention.

FIG. 2 is a block diagram of a first embodiment of the system 100 of the invention. Databases are described herein as being stored on a particular server; however, it should be understood that this concept includes a database stored on another server but which is accessible to the particular server. Moreover, reference to storing something (e.g., database or the like) on the server should be understood to encompass storing something on a mass storage device such as a hard drive, solid state memory or the like.

System 100 includes a database 102 of video content whose rights are owned by a broadcaster 120 or the like. The database 102 may be video content stored on or accessible via the internet (world wide web). The term "broadcaster" simply refers to the party who owns the rights to the video content and makes it available to viewers 124 via interactive TV or streaming websites.

The database 102 resides on a broadcaster server 200 or on a device which is accessible to server 200 (FIG. 2) which may be accessible over a distributed network 104 such as the Internet. Again, database 102 may be stored on a different server which is accessible to server 200. Server 200 includes a processor 202 which is connected via BUS 204 to a mass storage device 206, Read-Only-Memory (ROM) 208 and Random-Access Memory (RAM) 210 (which may by volatile or nonvolatile). The database 102 may be stored in RAM 210, ROM 208, or mass storage device 206. Accessory devices such as keyboard 212, touch screen 214 which serves both as a keyboard and a display, display device 216, and pointing device (mouse) 218 may optionally be connected to the server 200.

The database 102 contains unprocessed or raw video content which is accessed by a video content segmentation and classification engine 106 hereinafter referred to as a content analysis application. The phrase "raw video content" refers to video which has not been processed to identify objects.

In FIG. 2, the database 102 is shown as copied to database 108; however, copying of the database 102 is optional.

Database 108 resides on a video segmentation and classification server 300 (FIG. 2) which may be accessible over a distributed network such as the internet 104. Hereinafter reference to accessing the database 102 should be understood to be synonymous with accessing database 108 and vice versa. Again, database 108 is described as residing on the server 300 but it can reside on any server which is accessible to the server 300, for example, over a distributed network such as the internet.

Server 300 includes a processor 202 which is connected via BUS 204 to a mass storage device 206, Read-Only-Memory (ROM) 208 and Random-Access Memory 210 (which may by volatile or nonvolatile). The video file database 108 may be stored in RAM 210, ROM 208, or mass storage device 206. Accessory devices such as keyboard 212, touch screen 214 which serves both as a keyboard and a display, display device 216, and pointing device (mouse) 218 may optionally be connected to the server 300.

An inventory 114 of video objects is assembled by segmenting and classifying the raw video content from database 108 (or 102) to identify video objects therein. More particularly, the video content analysis application 106 segments the raw video content to yield a list of all the video objects in a given video. Then the video content analysis application 106 (which may be embodied in software or in a circuit, i.e. hardware or firmware) classifies the list of video objects to resolve occurrences of the same video object throughout the video. VOME 300 may be provided with separate software applications for performing segmentation and classification, or a single software application may perform both segmentation and classification.

Also disclosed is a method for providing active regions for an interactive layer for a video application. The method includes accessing video data that defines a plurality of frames showing a plurality of video objects, each video object being shown in a sequence of frames, generating region definition data through using video object recognition algorithms including video object segmentation and classification. Such region definition data defines a plurality of regions, each region corresponding to one of the plurality of video objects, wherein the outline of each region defined by the region definition data matches the outline of the corresponding video object as it is shown in the sequence of video frames.

According to one refinement of the invention the outline of each region dynamically changes in the sequence of frames to match changes in at least one of the perspective and the size and the angle of view in which the corresponding video object is shown in the sequence of frames.

According to one refinement of the invention, region definition data is used to define a plurality of active regions for interactive video viewing.

According to one refinement of the invention, the frames are shown to a user on a display as a video, and the region definition data is used to determine whether a user action directed to a location of at least one of these frame addresses one of the active regions.

According to one refinement of the invention, in response to a determination that the user action addresses a certain active region, additional information is presented to the user, the additional information pertaining to the video object that corresponds to the certain active region.

According to one refinement of the invention, the region definition data for at least one region includes a three-dimensional wireframe representation of the video object that corresponds to the region.

According to one refinement of the invention, the region definition data for the region further contains, for at least one frame of the sequence of frames in which the corresponding video object is shown, data defining a perspective view of the three-dimensional wireframe representation, the outline of the perspective view of the three-dimensional wireframe representation defines the outline of the region for the frame.

According to one refinement of the invention, the region definition data for the region further contains, for at least one pair of frames of the sequence of frames in which the corresponding video object is shown, data defining a change of the three-dimensional wireframe representation between the frames of the pair of frames.

According to one refinement of the invention, the three-dimensional wireframe representation includes a plurality of nodes, and the data defining the change includes data that defines a displacement of a position of at least one node with respect to at least another node.

According to one refinement of the invention, the data defining the change includes data that defines a change in at least one of the size and spatial orientation of the 3D wireframe representation.

The video content analysis application 106 may access an object information library 112 which is a database stored on or accessible to server 300. For example, the object information library 112 may be stored on a memory device such as memory device 206 and/or RAM 210 used to store the program instructions for the video content analysis application 106. The library 112 stores images of objects from different viewing angles or 3D models of the objects. The image information may be used as the index or key to link descriptive information with the video object. The library 112 further contains one or more of an object identifier, label, and or meta-data description of the video object which may be used to describe the video content object to prospective bidder.

Alternatively, the content analysis application 106 may utilize logic to identify video content objects without recourse to object information library 112.

Applicant hereby incorporates by reference to U.S. Pat. No. 6,625,310 entitled "Video segmentation using statistical pixel modeling" which discloses one of many methods for segmenting video data into foreground and background portions which utilizes statistical modeling of the pixels. A statistical model of the background is built for each pixel, and each pixel in an incoming video frame is compared with the background statistical model for that pixel. Pixels are determined to be foreground or background based on the comparisons.

Applicant hereby incorporates by reference to U.S. Pat. No. 6,462,754 entitled "Method and apparatus for authoring and linking video documents" which discloses an authoring method for video documents, involves creating anchorable information unit file based on boundaries of objects of interest such that objects interest are used to identify portions of video data.

Applicant hereby incorporates by reference to U.S. Pat. No. 7,325,245 entitled "Linking to video information" which discloses a system which enables dynamic linking between a variety of video formats including television broadcasts, web pages, and video displays which are stored on magnetic or optical media. Each frame of the video information is identified together with a plurality of locations within that frame. The locations selected by the user, for example using a pointing device, are then used to access associated information either within the system itself or on an external system.

Applicant hereby incorporates by reference to U.S. Patent Publication 20080294694 entitled "Method, apparatus, system, medium, and signals for producing interactive video content" which discloses a method for producing interactive video content on a content publisher computer. The method involves associating indicia with at least one image portion in the video content, the indicia being operably configured to follow the at least one image portion as a display position of the image portion changes in the video content. The method also involves associating an image portion identifier with the indicia, and associating link properties with the indicia, the link properties being operable to cause transmission of a content location request to a registration server in response to selection of the indicia by a viewer of the interactive video content. The content location request includes the image portion identifier.

In case of a manual or semi-automated process, the inventory 114 may be created by the content analysis application 106 with the assistance and/or review of a human analyst 110. The analyst 110 may manually identify a given instance of a video object by, for example, viewing a still image of the video and tracing the video object (manual process), and then utilize the content analysis application 106 (semi-automated process) to identify other occurrences of the video object in the video. Additionally or alternatively, an analyst 110 may review and refine the boundaries of an unmatched video object, and then subject the object to a second round of classification and/or second round of matching the object with objects in the object library.

Alternatively, the analyst 110 may review and edit objects which were automatically identified by the content analysis application 106.

Thus far we have described the process by which an inventory 114 of video objects is created from raw video. The video object inventory 114 is stored on a storage device which is either accessible over the distributed network 104 (internet) or a copy of the database 114 is made accessible over the network 104.

It is important to note that the video objects are used to create selectable regions (hyperlinks) which dynamically track the movement, size and position of the object throughout the video.

3D Rotoscoping

Figure 12:
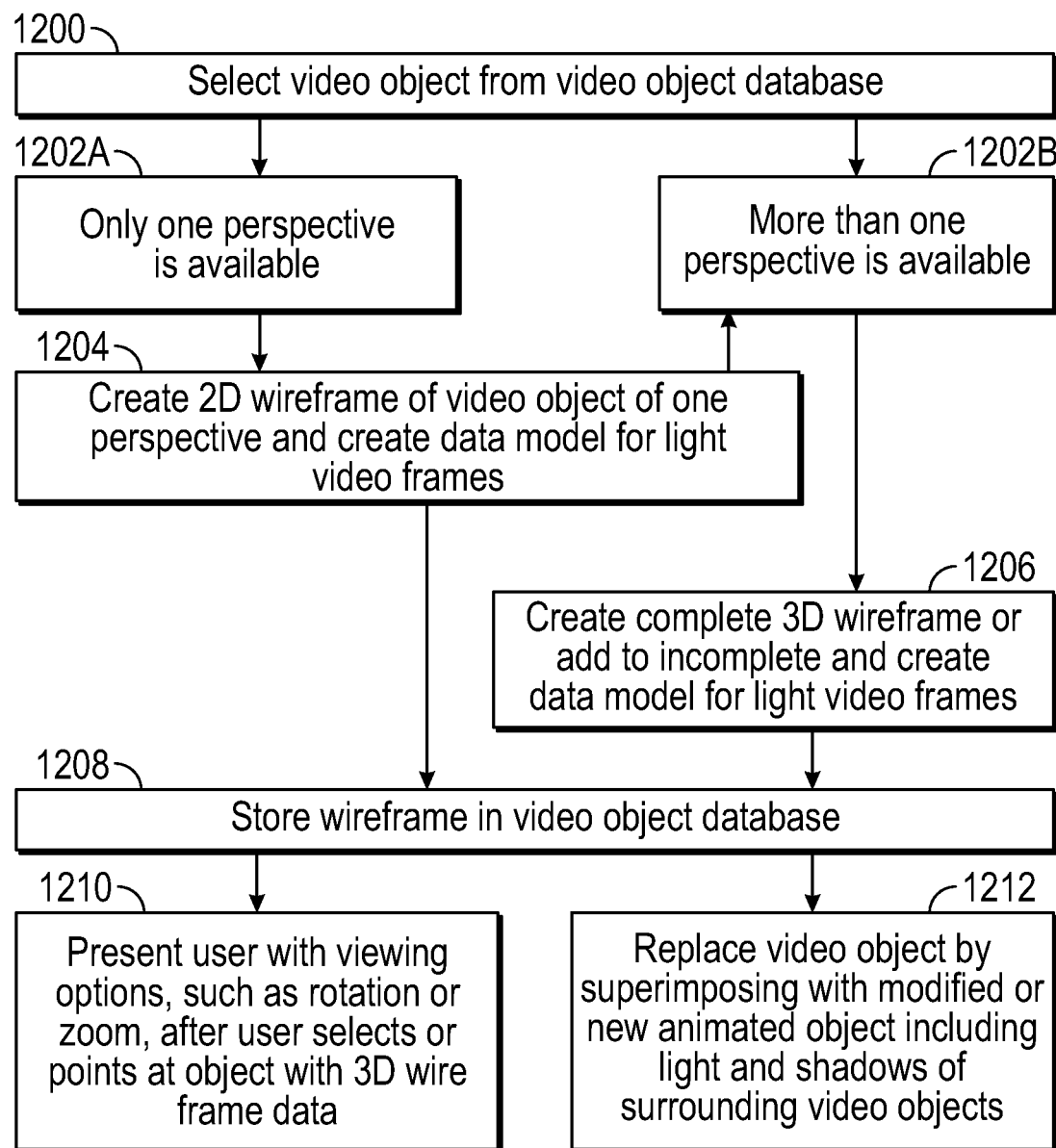
FIG. 12 is a flow diagram of three-dimensional rotoscoping.

FIG. 12 is a high-level flow diagram for 3-dimensional rotoscoping. The process begins in step 1200 with selecting a given video object.

If only one perspective of the video object is available (step 1202A) in the video then a two-dimensional wire frame of the video object is created. Additionally, a data model is created for light and shadows in the video frames in which the video object appears. The wireframe is then stored in a video object database (such as object information library 112 (step 1208).

If additional perspectives for the video object subsequently become available (step 1202B) then a three-dimensional (3D) wire frame is created (step 1206) or the new perspectives are used to update the existing three-dimensional wireframe. Additionally, a data model is created for light and shadows in the video frames in which the video object appears. The wireframe is then stored in the video object database (step 1208).

In step 1210 the user (video consumer) is presented with viewing options such as rotating of the object or zoom. It is also possible to "replace" video objects (step 1212) in the video by superimposing a modified or new animated object including light and shadows of surrounding video objects over the existing video object. For example, an obscured appearance of a video object such as a can of Pepsi® can be replaced (superimposed) with an animated object (3-dimensional wireframe of the object) without the need to re-shoot the video. It is even possible to superimpose an animated object (3-dimensional wireframe of the object) of a can of Coca-Cola® over the can of Pepsi®.

The present invention further includes a system for making an interactive overlay for a video. The system includes a server such as server 300 including a computer having a processor, random access memory, read-only memory, and mass storage memory, the server includes one or more video files stored in a video database. The system further includes object inventory database 112 stored on the server 300 and containing information describing a location (size, shape, orientation) of at least one video object within one of the video files. The object inventory database 112 may be compiled using any of the systems or methods disclosed in this specification or equivalents thereof. An overlay generation application (software or firmware) is stored and executed on the server 300. The overlay generation application creates a video overlay including at least one selectable hyperlink whose shape and position (coordinates) track a dynamic location of the video object in the video. The system stores the overlay on the server. As explained elsewhere in this specification the overlay is supplied to the video consumer server and is overlaid or superimposed over the video presentation. In some cases, the overlay is transparent; however, as will be explained below in some cases the overlay may include animated representations of video objects which are superimposed over and replace/obscure the underlying video object.

The system may optionally include a wireframe database 112A stored on the server 300 or the wireframe database may be included within the object inventory database 112 or any other database stored on the server. The wire frame database 112A stores three-dimensional wireframe representations of at least one video object.

The overlay generation application may optionally match occurrences of video objects in the object inventory library with three-dimensional wireframe representations of the video object (stored in the wireframe library database or the object inventory database) and create a video overlay including matched wire frame representations wherein the shape and position of the wireframe representation tracks a dynamic location of the video object in the video. In other words, the wireframe representation of the object is superimposed over the corresponding video object. The superimposed wireframe representation obscures (replaces) the video object.

The wire frame library database 112A may optionally include a lighting model which defines/specifies the light distribution on the video object. For each occurrence of a video object in a video frame the lighting model would define/specify the light distribution on the video object.

According to another embodiment the system for making an interactive overlay for a video includes a server such as server 300 including a computer having a processor, random access memory, read-only memory, and mass storage memory, the server including one or more video files stored in a video database. The system includes an object inventory database 112 stored on (or accessible by) the server and containing information describing a location of at least one video object within one of the video files. The system includes a wireframe database stored on (or accessible by) the server, the wireframe database storing three-dimensional wireframe representations of at least one video object; and an overlay generation application (software or firmware) executed on the server. The overlay generation application matches occurrences of video objects in the object inventory library with corresponding three-dimensional wireframe representations of the video object and creates a video overlay including matched wireframe representations of the video object wherein the shape and position (coordinates) of the wireframe representation track a dynamic location of the video object in the video. The system stores the overlay on the server. As explained elsewhere in this specification the overlay is supplied to the video consumer server and is overlaid or superimposed over the video presentation. The video overlay may optionally include at least one selectable hyperlink whose shape and position tracks a dynamic location of the video object in the video.

According to another embodiment the system for making an interactive overlay for a video includes a server including a computer having a processor, random access memory, read-only memory, and mass storage memory, the server including one or more video files stored in a video database. The system includes an object inventory database stored on the server and containing information describing coordinates of at least one video object within one of the video files. The system further includes a wireframe database stored on the server; the wireframe database stores three-dimensional wireframe representations of at least one video object. A wireframe generation application (software or firmware) executed on the server selects video objects from the video object inventory database and generates a three-dimensional wire frame of the selected video object from multiple perspective occurrences of the video object in the video file and stores the three-dimensional wireframe in the wireframe database. The wireframe generation application may optionally generate a lighting model for each occurrence of a video object in a video frame from light distribution on the video object.

The system may further include an overlay generation application (software or firmware) executed on the server which matches occurrences of video objects in the object inventory library 112 with corresponding three-dimensional wire frame representations stored in the wire frame library 112A. The overlay generation application creates a video overlay including matched wireframe representations of the video objects wherein the shape and position of the wireframe representation tracks the dynamic location of the video object in the video. The overlay generation application stores the overlay on the server. The video overlay may optionally include at least one selectable hyperlink whose shape and position tracks a dynamic location of the video object in the video.

The creation of three-dimensional wire frames and lighting models is well known in the art and is disclosed in the following US patents whose disclosure are hereby incorporated by reference: U.S. Pat. No. 7,602,404 entitled Method and apparatus for image assisted modeling of three-dimensional scenes; U.S. Pat. No. 6,983,082 entitled Reality-based light environment for digital imaging in motion pictures; U.S. Pat. No. 6,954,202 entitled Image-based methods of representation and rendering of three dimensional object and animated three-dimensional object; U.S. Pat. No. 6,919,962 entitled Reflectometry apparatus and method; U.S. Pat. No. 6,858,826 entitled Method and apparatus for scanning three-dimensional objects; U.S. Pat. No. 6,685,326 entitled Realistic scene lighting simulation; U.S. Pat. No. 6,628,298 entitled Apparatus and method for rendering synthetic objects into real scenes using measurements of scene illumination; U.S. Pat. No. 6,529,206 entitled Image processing apparatus and method, and medium therefore; U.S. Pat. No. 6,504,546 entitled Method of modeling objects to synthesize three-dimensional, photo-realistic animations; U.S. Pat. No. 6,434,265 entitled Aligning rectilinear images in 3D through projective registration and calibration; U.S. Pat. No. 6,333,749 entitled Method and apparatus for image assisted modeling of three-dimensional scenes; U.S. Pat. No. 6,281,904 entitled Multi-source texture reconstruction and fusion; and U.S. Pat. No. 6,281,903 entitled Methods and apparatus for embedding 2D image content into 3D models.

According to another embodiment, the system for automatically segmenting and classifying video content into objects includes a server such as server 300 including a computer connectable to a distributed network and having a processor, random access memory, read-only memory, and mass storage memory, the video segmenting and classification server including one or more video files stored in a video database. The system includes a wireframe database stored on or accessible to the server. The wire frame database stores three-dimensional wireframe representations of at least one video object and at least one of descriptive information and semantic information used to describe the object. The descriptive information and semantic information is the same information described elsewhere in this disclosure in the context of segmenting and classifying video objects. The system further includes an object inventory database containing information describing a location of at least one video object within one of the video files. A video content analysis application executed on the processor, segments the video files to identify locations of video objects. The application searches for a matching (corresponding) occurrence of the video object in the wireframe database. For each match, the application retrieves information describing the video object from the wireframe database, and stores in the object inventory database 112 information describing the dynamic location of the video object within the video and information describing the video object.

According to one embodiment, a VOME 300 auctions adverting rights to video content objects stored in the inventory database 114 to advertisers 122. The auction is performed by automated auction application 126 on VOME server 300 which communicates with an automated bidding application on the advertiser server 500. More particularly, auction application 126 is a software application executed on processor 202 and stored on one of mass storage device 206, ROM 208 and RAM 210. The auction application 126 auctions rights to associate content with a video object. The auctioned rights may be time limited, i.e., rights which expired after a pre-defined amount of time has expired. Auction application 126 may include logic for automatic billing and/or settlement of bids.

The auction application 126 stores auction information identifying the owner of rights to associate content with an auction, the duration of such rights, content to be associated with the object, and billing information. See, FIG. 7. The auction information is stored in an auction information database on server 300. More particularly, auction information database is stored on one of mass storage device 206, ROM 208 and RAM 210.

The VOME server 300 includes an object association application which creates a video overlay used to associating relevant content received from the advertiser 500 with the video objects. The overlay is supplied by the VOME server 300 to the broadcaster 120 and in turn from the broadcaster 120 to the viewer 124 along with the underlying video. Alternatively, the overlay may be supplied by the VOME server 300 to the viewer 124.

Figure 3:
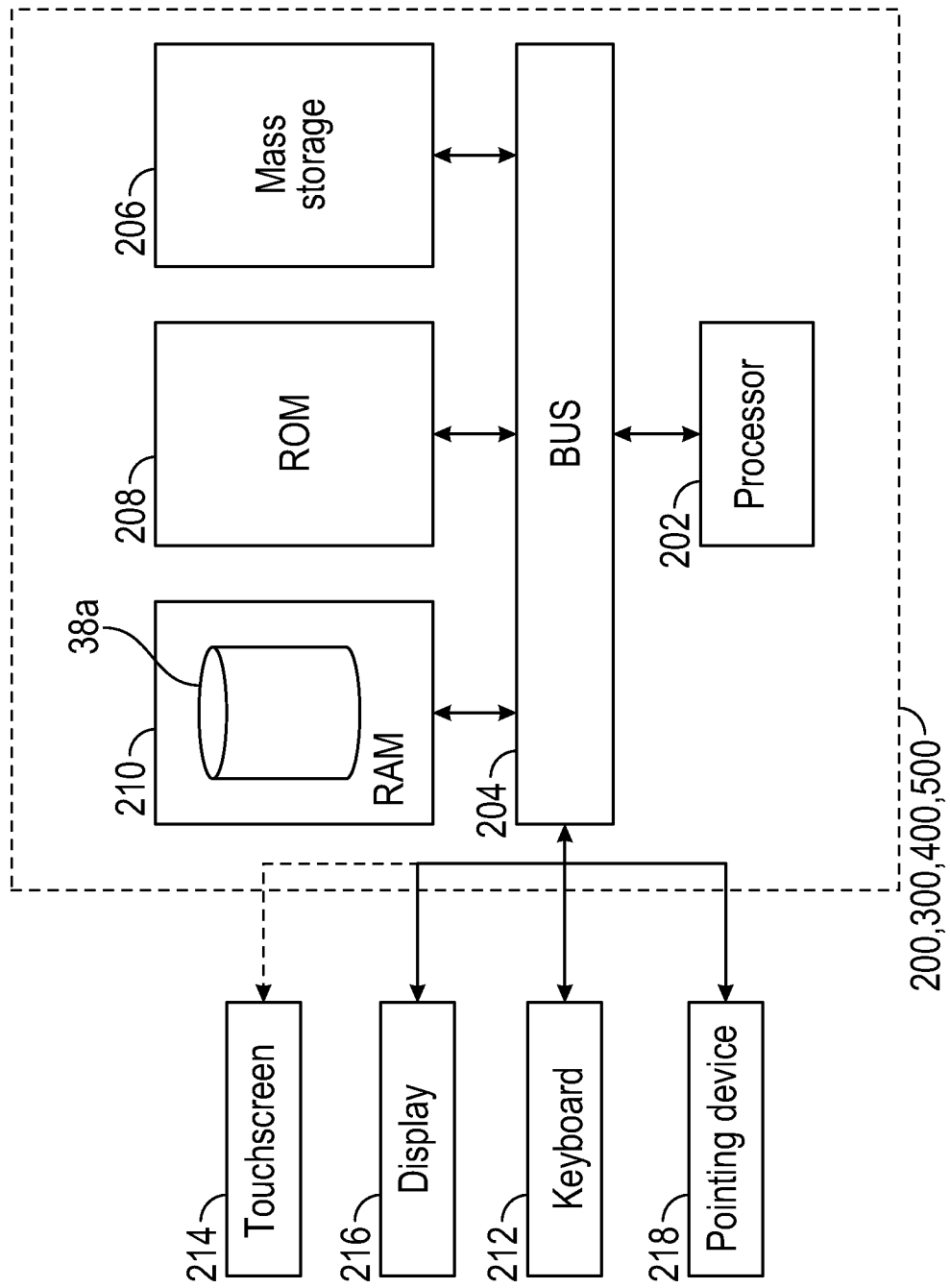
FIG. 3 is a block diagram of a computer on which the video content analysis application executes.

The advertiser 122 uses a computer or server 500 (FIGS. 2, 3) to bid on the right to associate content with a video object. Computer 500 includes a processor 202 which is connected via BUS 204 to a mass storage device 206, ROM 208 and RAM 210 (which may by volatile or nonvolatile). An automated bidding application executes on processor 202 and may be stored on one or more of the ROM 208, RAM 210, and mass storage 206. The automated bidding application communicates auction bids to the automated auction application on the VOME 300. The automated bidding application is responsive to information from VOME 300 describing the video object(s) being auctioned. The use of video content objects transforms raw video into interactive video content.

The viewer 124 uses a computer 400 (FIG. 3) to access the video content made available by broadcaster 120 on a website or the like accessible over a distributed network such as the Internet. Computer 400 includes a processor 202 which is connected via BUS 204 to a mass storage device 206, Read-Only-Memory (ROM) 208 and Random-Access Memory (RAM) 210 (which may by volatile or nonvolatile). A web browser executes on the processor and is used to access web sites on the Internet. The viewer 124 interacts with the video overlay by selecting or rolling over a region representing a video object using a conventional pointing device 218, and/or using a touch sensitive screen 214 such as is known in the art. Interaction by the video viewer 124 triggers display of supplemental content such as advertisements. The advertiser 122 is bidding on the right to supply the relevant content.

The auction of advertising rights may be automated. For example, the VOME 300 may request a minimum starting bid and specify bidding increments, and each advertiser 122 may provide automated bids for viewer matching specified criteria up to a pre-determined maximum bid.

According to a variation of the previous embodiment, the auction of advertising rights to a video (including all of the video objects therein) or to individual video content objects is triggered when a video viewer 124 accesses the broadcaster's website and/or requests access to video content accessible therethrough. According to this embodiment, the broadcaster 120 is able to provide viewer profile information for the video viewer (consumer) 124 to the advertiser 122. The viewer profile information may, for example, contain information regarding web sites previously accessed by the viewer 124, the video viewer's interactions with this or other video and/or video objects, and/or information regarding the purchasing habits of the viewer 124. As will be explained in further detail below, any of the embodiments described herein may include a viewer (behavioral) profile stored in an analytics database on a memory device accessible to the server.

Regardless of the starting point (manual or automated identification of objects, the end product is a database (video content inventory) 114 listing object id, frame id, coordinates of object and may include a semantic model for each identified object within a given media presentation (movie clip). This inventory 114 may be offered on an advertising market exchange (VOME) for advertisers to bid on. Advertiser will bid on inventory based on contextual information and multifaceted viewer profile of the viewer viewing the video content and the inventory description of the video.

The advertiser may decide to push an overlay message content on the video object while a user with a certain multifaceted user profile views it. The interaction of a viewer with video objects may be used to refine the messages pushed to the viewer in the same way as search terms are currently used to refine messages to users while searching for something.

Figure 4:
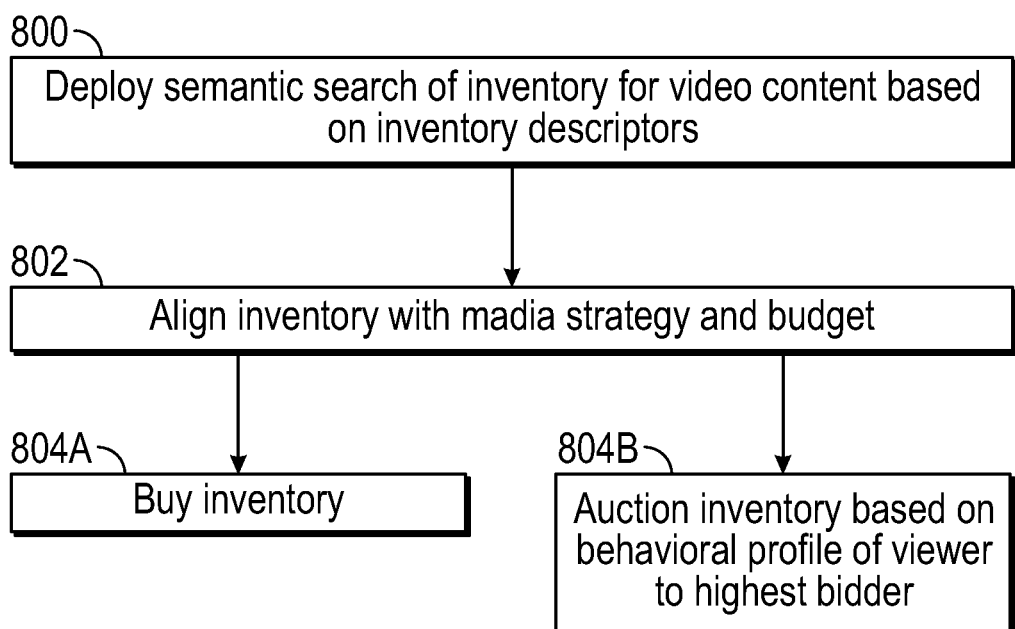
FIG. 4 is a flowchart of how an advertiser interacts with the video object market exchange system according to the present invention.
Figure 5:
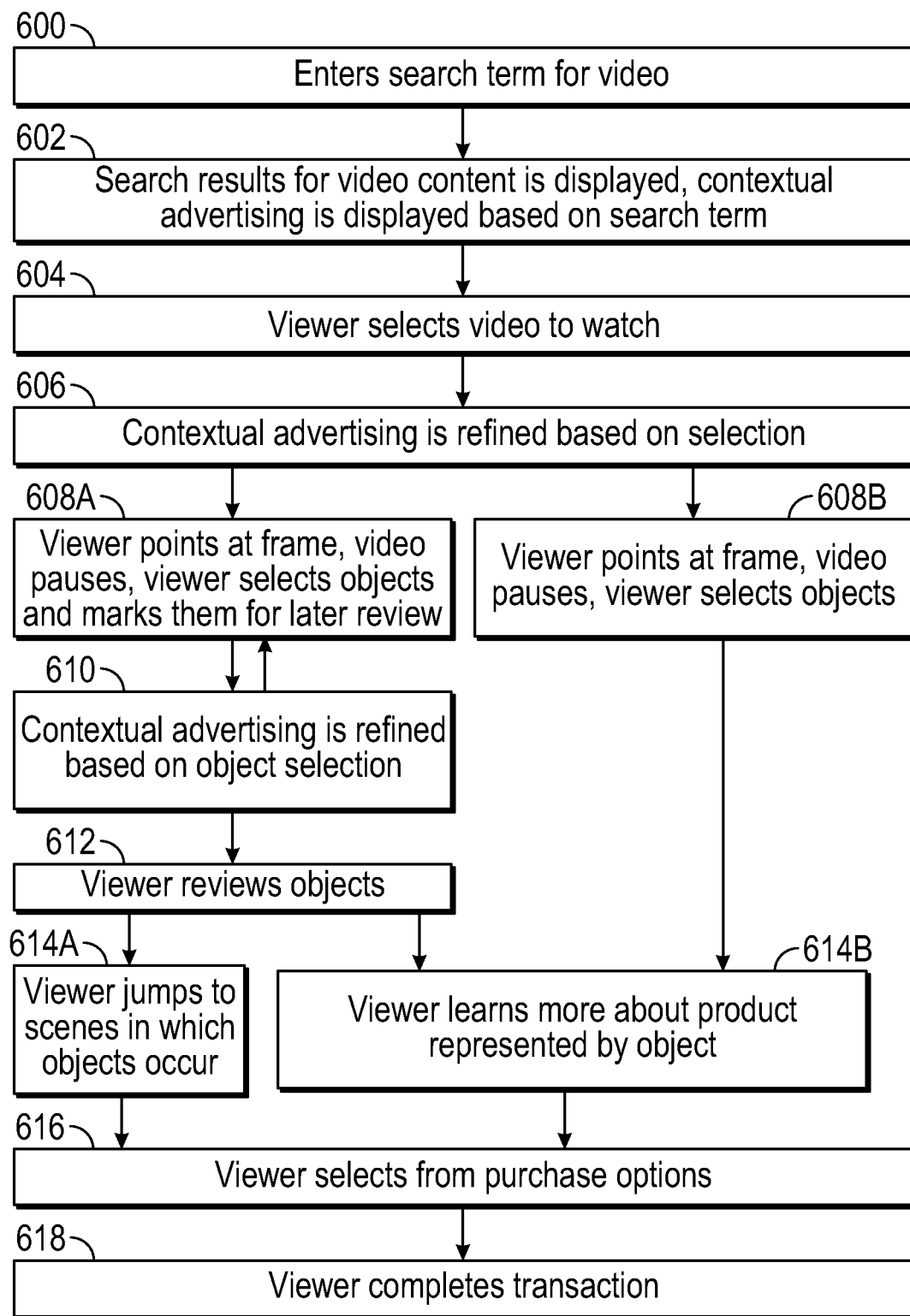
FIGS. 5 and 6A-6D are flowcharts showing the interactions of a viewer with the video object market exchange system according to the present invention.
Figure 6A:
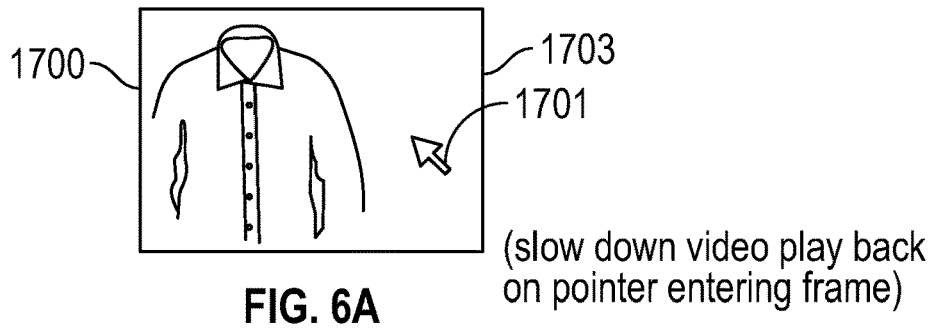
Figure 6B:
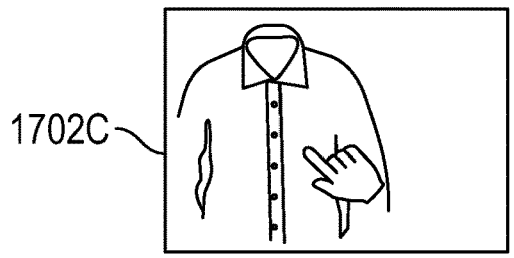
Figure 6C:
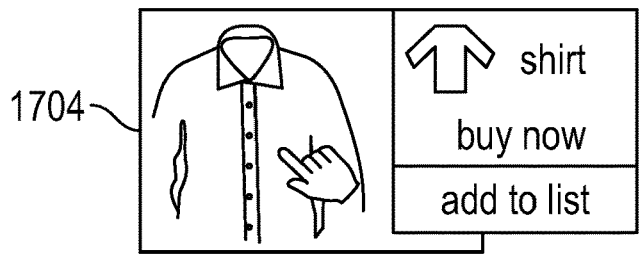
Figure 6D:
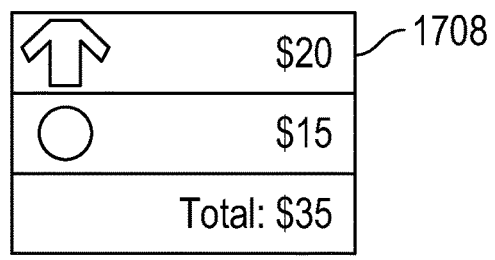

FIG. 4 is a flowchart of how an advertiser interacts with the VOME 300. In step 800, the advertiser deploys a search of the video content inventory 114 based on inventory descriptors or may submit images of products that he would like to purchase inventory rights to. The use of a semantic search as opposed to a more rudimentary keyword search is preferred because the semantic search is able to cope with the variations in descriptor information.

In step 802 the VOME 300 returns a list of objects and object classes matching the advertiser's search, and the advertiser aligns the search results with the advertiser's media strategy and budget. In step 804A, the advertiser simply chooses to purchase the inventory identified in step 802. Alternatively, in step 804B the advertiser specifies to the VOME 100 items which the advertiser is interested in bidding upon during the real-time auction. Moreover, the advertiser may specify a starting bid and/or a maximum bid. Alternatively, the VOME 100 may specify the starting bid and incremental increases in the bid, and the advertiser merely specifies a maximum bid.

FIGS. 5 and 6A-D are flowcharts showing the interactions of a viewer with the VOME 300. In step 600, a viewer searches or browses for video content. In step 602, relevant content (contextual advertising) relating to the key words used in step 600 is displayed along with a list of video content search results. In step 604 the viewer selects a video to view, and in step 606 the contextual advertising is refined in relation to the selected video.

In steps 608A and 608B the viewer is viewing the selected content (1700 in FIGS. 6A-6D) and encounters video objects of interest. According to one embodiment pointing at the frame by, e.g., bringing pointer 1701 of pointing device 218 into video frame 1703 (FIG. 6A) will cause the video to slow the video down, which allows the viewer to select an object. In the case of interactive TV or three-dimensional (3D) videos, the viewer can use a variety of pointing means including, but not limited to, a virtual pointer of the type popularized by the Nintendo Wii® which utilizes a glove or the like with sensors capable to determine X, Y, and Z coordinates. In step 608A the viewer merely tags the objects of interest for later review (1702 and 1704 in FIGS. 6B and 6C), whereupon in step 610 the contextual advertising is once again refined (this time in relation to the objects of interest) and the behavioral profile (analytics database) of the viewer is updated. Steps 608A and 610 may be repeated any number of times during the viewing of the video. In step 612, the viewer reviews the list of tagged items from step 608A and either jumps back to the scenes in which the items appear (step 614A and 1704 in FIG. 6C) or learns more about the items selected, e.g., price, features etc. (step 614B). In step 616 the viewer selects one or more objects (products) to purchase (from the tagged or identified objects), and in step 618 the viewer completes the transaction (1708 in FIG. 6D).

Step 608B is an alternative to step 608A and presents the viewer with the option to immediately jump to 614 and learn more about the object. The information associated with the video object may be displayed as an overlay pop-up or in a field next the video player. Each time the viewer interacts with video objects his/her profile gets updated in the database.

Social Networking

Figure 9:
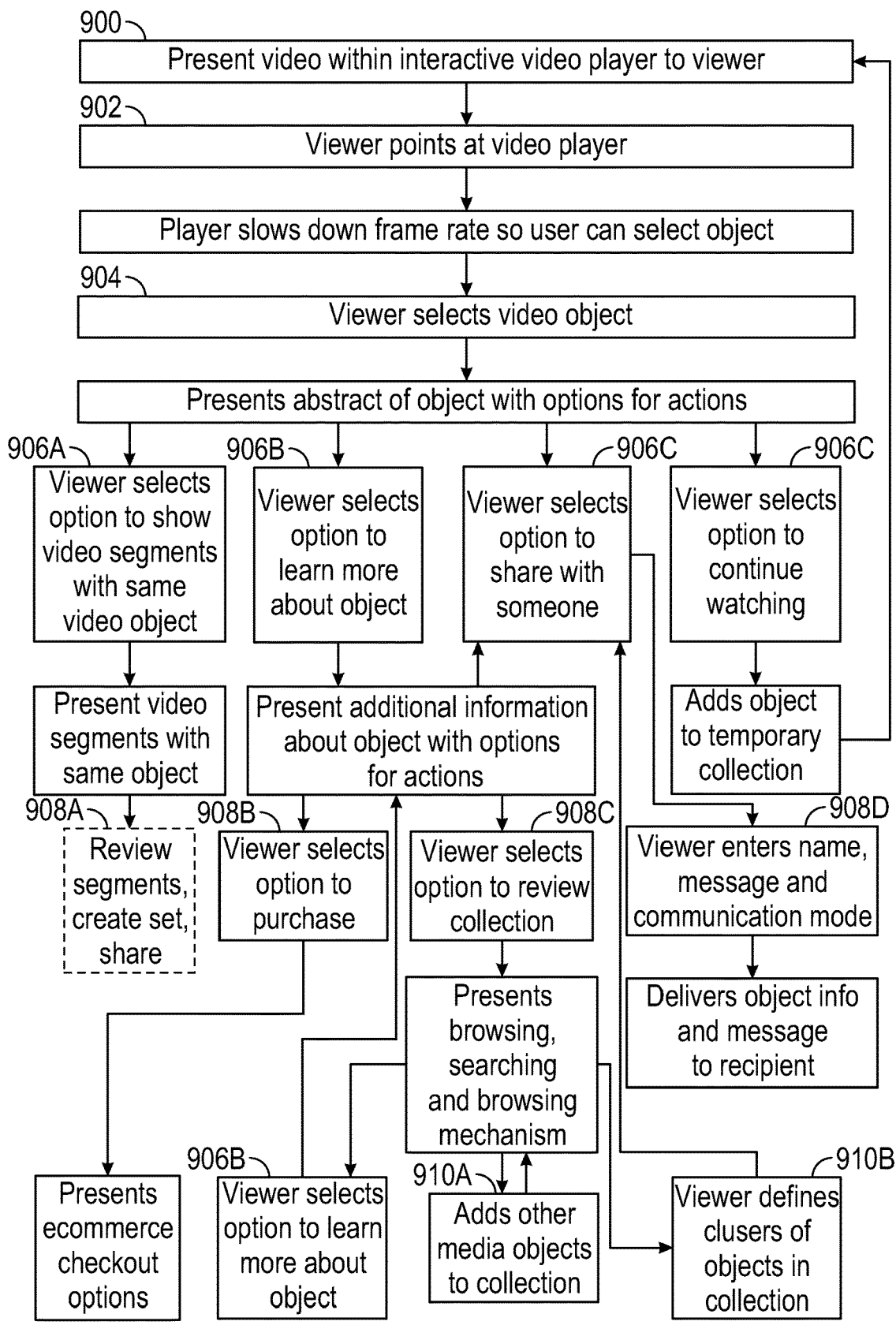
FIG. 9 is a flow chart demonstrating the sharing of video objects using social networking.
Figure 10A:
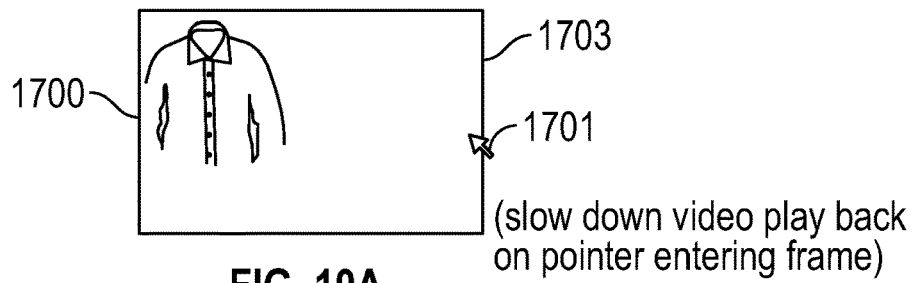
FIGS. 10A-10D are graphical depictions of steps in the flowchart of FIG. 9.
Figure 10B:
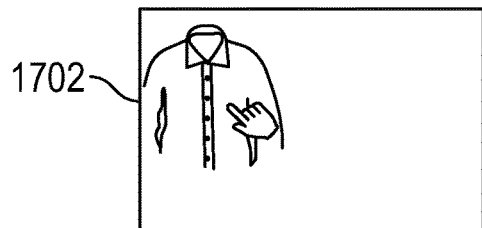

A further aspect of the invention will be described with reference to FIGS. 9-11. FIG. 9 is a high-level flowchart showing the interactions of a viewer with the VOME 300. FIGS. 10A-10D and 11A-11B are a graphical depiction of various steps in the flowchart of FIG. 9. In step 900 the viewer 124 views video content having video objects. As described above, the video presentation slows or stops as the user points at or rolls-over (step 902) the presentation screen, and selects a video object using a pointing device such as a mouse or a finger (or the like) on a display screen which may be touch sensitive (FIG. 9 step 904 and FIG. 10A). Selecting refers to both rolling-over the object with the pointing device (without a mouse click or a keyboard command) and to positioning the pointing device over the object and actuating one of the buttons on the mouse or keyboard. In a traditional TV setting the user may use the 5-star control of a remote controller to select a video object.

Once the object has been selected (FIG. 9 step 904 and FIG. 10B), the viewer displays an abstract of the video object in form of an overlay on top of the current viewing window or on a new window adjacent the current viewing panel. The Abstract may include descriptive information (relevant content) about the object (name, brand name, make, model, vendor, price, etc.) and classification information about the object.

Figure 10C:

The user (viewer of video) 124 is presented with a menu of options (FIG. 10C). For example, the viewer 124 may search for other occurrences of the object in both the current video or in other videos (FIG. 9 step 906A, and FIG. 11B). Moreover, the viewer may expand the search to encompass other objects which have similar classification such as the same make but different models (other Ferragamo shoes), or other red high heeled shoes, etc.

In step 908A, the user is presented with a list of viewable video segments containing the selected video object. At this point the user can choose to view any of the segments and/or proceed to steps 906B, 906C or 906D.

The viewer 124 may be presented with an option to retrieve more detailed information about the object (step 906B). Such information may include details about the materials or specifications of the object. The user may also be presented with the option to view a three-dimensional wire frame rendering of the object. The 3D wire frame is created by the VOME 300 when the object is initially identified and classified. Depending on how many perspective facets of an object are available, a complete or partial 3D wire frame may exist for a given object. The viewer 124 presents the user with various options to manipulate and interact with the 3D wire frame. For example, the viewer 124 may rotate and zoom the 3D wire frame to display the rendering from different perspectives.

As described above, the user may be presented with the option to add the video object to a shopping cart (FIG. 9 step 908B and FIG. 10C). Although not specifically illustrated in FIG. 9, the option to purchase may be nested under each of the menu items such that the user may always elect to purchase without having to retrace his/her steps. In fact, each of the menu options described herein may be organized in any number of ways and the inventive concept is not limited to the specific way they are presented. Thus, steps 906A-906D may be nested.

The shopping cart may be a conventional electronic shopping cart which enables the user to purchase the object or flag it to the user's wish list for future purchase. The viewer 124, VOME 300, or system 100 tracks objects purchased by the user and items added to the user's wish list, and such information may be used to analyze the user's buying trends etc. More particularly, an analytics database records the interactions of the consumer. The analytics database stores information regarding the video files or types of video files (genre or the like) accessed by the consumer, the objects selected by the consumer, items purchased by the consumer. The analytics database may be stored on or accessible to (via the distributed network, e.g., internet) the VOME 300 or system 100. The viewer 124 also enables the user to manually indicate that the user owns a given object even if it was not purchased through the VOME 300.

The VOME 300 allows the user to share individual video objects or create and share a collection of video objects with one or more friends by selecting the video objects or the collection of objects and selecting individual friends or sets of friends (FIG. 9 steps 906C and 910B, and FIG. 10C). The viewer 124 may include a software plug-in application for a social networking site (Facebook™ application, Twitter™ application) or the like which enables the user to add the video object to the user's Facebook™ account without leaving the portal (VOME 300) through which the user was viewing the video. As used herein the term social networking site is equivalent in all respects to social networking server and encompasses Facebook™ application, Twitter™ application which enable a user to share information to a wide audience with or without specifying individual recipients.

The plug-in application also enables the user to share the image/video segment etc. with one or more social networking contacts ("Facebook™ friends"). The plug-in application is software. The plug-in may share data linking or pointing to the video object or library of such objects. The video object or library of video objects may be stored on the YOM 300 or on the user's computer 400. Data transferred to Facebook or other social networking sites may also be stored on a 3d party server such as or the like, or the social networking site may simply store a link to data stored on the VOME 300.

Finally, the user may simply elect to un-pause the video and continue watching (step 906D). Unpausing may also be accomplished by pointing at the content of the video frame.

Figure 10D:
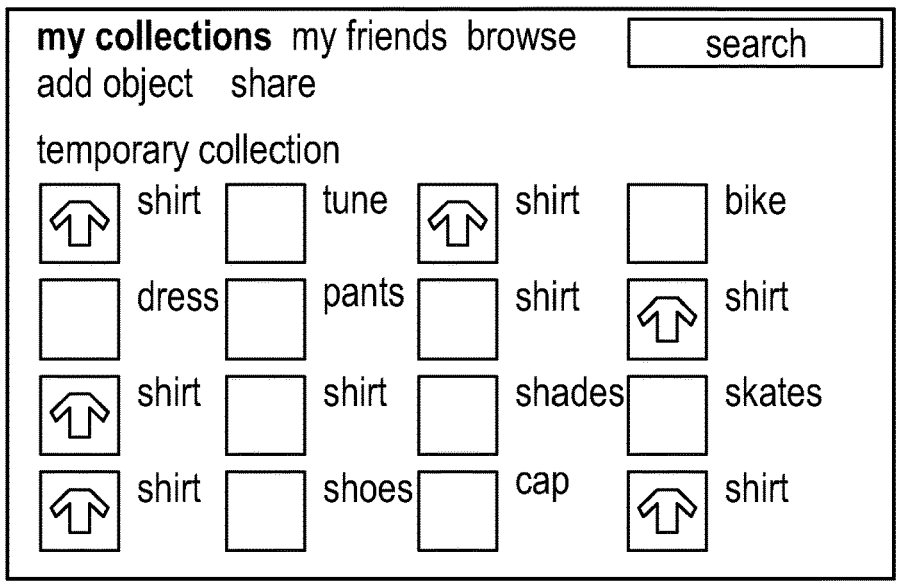
Figure 11A:
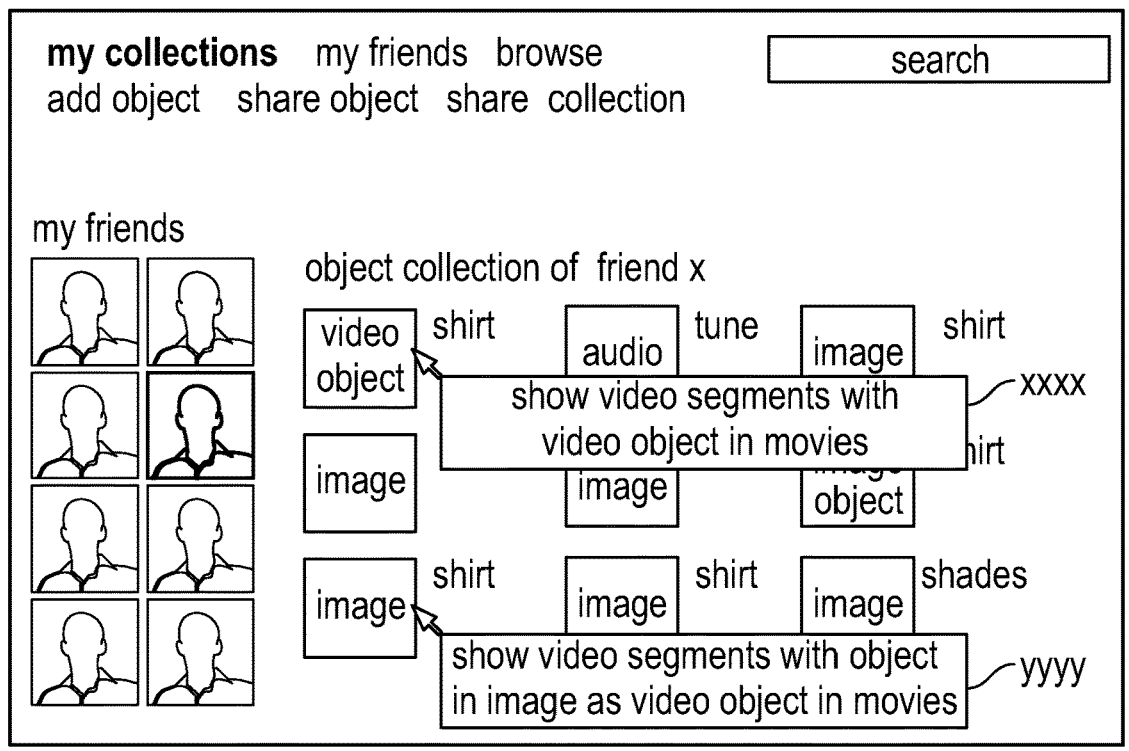
FIGS. 11A-11B are graphical depictions of steps in the flowchart of FIG. 9.
Figure 11B:
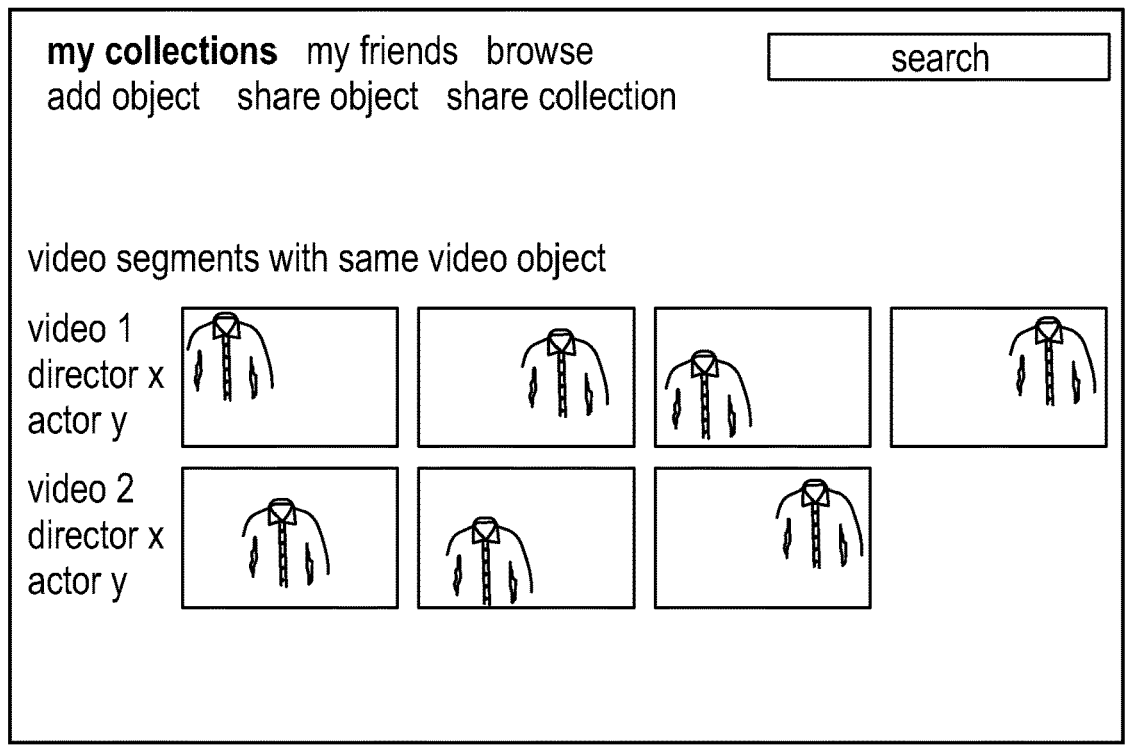

According to another aspect of the invention, the user may organize objects added to the collection of video objects (FIG. 9, step 910B, FIG. 10D, FIG. 11A). For example, the user may define clusters of objects in a collection and share the entire collection instead of sharing individual objects. VOME 300 allows users to create a "wardrobe collection" with sub-collections. VOME 300 allows users to tag objects with tags like "I own this", "I would like to have this". VOME 300 keeps track of the purchase history of user and automatically tags objects that have been purchased through VOME 300 as "I own this". See FIG. 10D.

The user may add other media types to these collections such as an image of an object (FIG. 9, step 910A, and FIG. 11A). By adding a file or a link to a file which contains image information to a collection, VOME 300 matches the image object with all known video objects and provides the user with the option to search across multimedia data bases for other instances of the object. The user may also add data types that do not contain image information such as an audio file. By sharing a collection with a friend, the user also shares a link to files that do not contain images. The friend receiving the link to the collection may have access to the files that do not contain image information.

One embodiment of the invention is a system for viewing video having segmented video objects. The system includes a video server 200,300 which communicates with a viewer server 400 over; for example, a distributed network such as the internet (a.k.a. World Wide Web). At least one video file stored in a video database 108 on or accessible to video server 200. Similarly, an object inventory database 114 stored on or accessible to the video server 200. The object inventory database 114 stores information describing a location of at least one video object within the at least one video file. Relevant content in a database stored on or accessible to the video server 200. A video overlay links the relevant content with a given video object and creating a selectable hyperlink whose position tracks a dynamic location of the video object in the video.

The system includes (and executes) a software application for accessing and displaying the at least one video file stored in the video database, the software application including means for interacting with the video overlay to select an object displayed in the video file.

The video server 200, 300 may include (and execute) an application (software application) for displaying relevant content associated with the object selected by the consumer server.

The video server 200, 300 may include (and execute) a software application for storing one of the object or a data associated with the object selected by the consumer server in a collection of objects. The video server may include software for sharing the collection of objects or sharing a data associated with the collection of objects. For example, the video server may share the collection of objects or data associated with the collection of objects with a social networking service (Facebook®, Twitter® or the like) via the distributed network (internet). The video server may post the collection of objects or data associated with the collection of objects to a social networking server accessible service via the distributed network. Finally, the social networking server may issue an alert to at least one user-specified person that data is posted to the server.

The video server may include (and execute) a software application for searching at least one of the object inventory database and the at least one video file for occurrences of the selected object, and selectively displaying segments of the at least one video file containing the selected object.

The video server may include (and execute) a software application for searching at least one of the object inventory database and video files in the video database for occurrences of the selected object, and selectively displaying segments of the at least one video file containing the selected object.

The video server may include (and execute) a software application for purchasing an item associated with the selected object.

The video consumer software application may include a content display application which interacts with the video overlay (software) and displays relevant content when a given video object is selected or rolled-over with a pointing device.

The video server may include (and execute) a software application for storing one of the object or a hyperlink associated with the object selected by the consumer server in at least one user-defined collection of objects.

Another aspect of the invention relates to a method for interacting with an advertising market exchange. The method includes a step of providing at least one video file stored in a video database on or accessible to a video server via a distributed network; providing an object inventory database stored on or accessible to the video server via the distributed network, the object inventory database containing information describing a location of at least one video object within the at least one video file; and providing a video overlay linking the relevant content with a given the video object and creating a selectable hyperlink whose position tracks a dynamic location of the video object in the video. According to the method, the at least one video file is accessed and displayed; and a user interacts with the video overlay to select an object displayed in the video file.

The method further comprises a step of displaying relevant content associated with the object selected by the consumer server.

According to one aspect of the aforementioned method, the selected object or data associated with the selected object is stored in a collection of objects. The collection of objects or data associated with the collection may be shared. For example, the collection may be shared over a distributed network (internet) with a social networking service or social networking server. The social networking server may issue an alert or message (e.g. email, SMS message or the like) to at least one user-specified person that data is posted to the server.

The method may include a step of searching at least one of the object information library and the at least one video file for occurrences of the selected object, and selectively displaying segments of the at least one video file containing the selected object.

The method may include a step of searching at least one of the object information library and video files in the video database for occurrences of the selected object, and selectively displaying segments of the at least one video file containing the selected object.

The method may include a step of purchasing an item associated with the selected object. The purchasing step is performed by a software application executed on the video server.

Also disclosed is method for ranking videos according to the duration of time a given object appears in the video. The method encompasses providing a database of video files and searching each video file for the occurrence of at least one object. Next, the method entails using software to determine a duration of time that the at least one object was displayed in each the video file; and for each the video file outputting information specifying the title of the video file and the duration of time.

The method may further include outputting information specifying a ranking of the duration of time in a given the video file relative to each of the other video files in the database. In other words, the video file in which the at least one object was displayed for the longest duration will have a higher ranking than a video file in which the object did not appear for as long a duration.

The aforementioned method may be used to search each video file for the occurrence of first and second objects and determine a duration of time that each of the first object and the second object were displayed in each the video file. For each video file the software will output information specifying the title of the video file and each the durations of time.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

The invention claimed is:
1. System for ranking segmented video files, comprising:
a server including a computer, said server including one or more segmented video files stored in a video database,
each said segmented video file containing video information for visually reproducing at least one video object, where a video object is a visual component of the video file;
an object inventory database operating on said server and containing information describing a location of said at least one video object within each of at least one image frame within at least one of the segmented video files;
the server executing software indexing each segmented video file for the occurrence of at least one video object;

the server executing software determining a duration of time that the at least one video object appears in each video file; and the server executing software outputting information specifying a ranking of the duration of time in each of the video files relative to other of the video files in the video database.

2. The system of claim 1, wherein the server executing software is further outputting information specifying the title of the video file.

3. The system of claim 1, wherein the server executing software is ranking the duration of object appearances in video files according to a duration of time, frequency and context a given object appears in the video.

* * * * *